(12) United States Patent
Hagiwara et al.

(10) Patent No.: US 11,959,515 B2
(45) Date of Patent: Apr. 16, 2024

(54) CONVEYING SYSTEM, ROTARY FORGING METHOD, ROTARY FORGING APPARATUS, METHOD FOR MANUFACTURING BEARING, METHOD FOR MANUFACTURING VEHICLE, AND METHOD FOR MANUFACTURING MECHANICAL DEVICE

(71) Applicant: NSK LTD., Tokyo (JP)

(72) Inventors: Nobuyuki Hagiwara, Fujisawa (JP); Atsuhiro Ishii, Fujisawa (JP); Tokumasa Kikuchi, Fujisawa (JP); Tsuyoshi Kamoda, Hanyu (JP)

(73) Assignee: NSK LTD., Tokyo (JP)

( * ) Notice: Subject to any disclaimer, the term of this patent is extended or adjusted under 35 U.S.C. 154(b) by 842 days.

(21) Appl. No.: 16/968,770

(22) PCT Filed: Feb. 13, 2019

(86) PCT No.: PCT/JP2019/005014
§ 371 (c)(1),
(2) Date: Aug. 10, 2020

(87) PCT Pub. No.: WO2019/159935
PCT Pub. Date: Aug. 22, 2019

(65) Prior Publication Data
US 2021/0010533 A1    Jan. 14, 2021

(30) Foreign Application Priority Data

Feb. 14, 2018 (JP) ................................. 2018-023722

(51) Int. Cl.
*B21J 13/08* (2006.01)
*B21D 39/00* (2006.01)
(Continued)

(52) U.S. Cl.
CPC ............ *F16C 19/186* (2013.01); *B21D 39/00* (2013.01); *B21J 5/02* (2013.01); *B21J 9/02* (2013.01);
(Continued)

(58) Field of Classification Search
CPC ..... B21D 39/00; B21J 5/02; B21J 9/02; B21J 9/022; B21J 9/025; B21J 13/08;
(Continued)

(56) References Cited

U.S. PATENT DOCUMENTS

| | | | |
|---|---|---|---|
| 4,564,348 A * | 1/1986 | Hehl | B29C 45/17 198/950 |
| 7,111,390 B2 * | 9/2006 | Shimamura | B81C 3/002 29/700 |

(Continued)

FOREIGN PATENT DOCUMENTS

| | | |
|---|---|---|
| CN | 106516632 A | 3/2017 |
| CN | 107427900 A | 12/2017 |

(Continued)

OTHER PUBLICATIONS

US 2008/0104843 A1, Matsushita, May 8, 2008.*

(Continued)

*Primary Examiner* — Douglas A Hess
(74) *Attorney, Agent, or Firm* — Sughrue Mion, PLLC

(57) ABSTRACT

A moving element (21) holding a workpiece (a hub unit bearing (1)) is horizontally loaded into an internal space (23) of an exterior (17) from an external space of the outer package (17), while being guided by a guide member (20) through an opening portion (a front surface side opening portion (25)) provided in the exterior (17) constituting a rotary forging apparatus (16). After completion of the loading process, the workpiece is subjected to rotary forging, using a forming die (18).

9 Claims, 9 Drawing Sheets

(51) Int. Cl.
| | |
|---|---|
| *B21J 5/02* | (2006.01) |
| *B21J 9/02* | (2006.01) |
| *B21K 19/00* | (2006.01) |
| *B21K 25/00* | (2006.01) |
| *B21K 27/00* | (2006.01) |
| *B23P 19/00* | (2006.01) |
| *B23P 21/00* | (2006.01) |
| *B65G 35/00* | (2006.01) |
| *F16C 19/18* | (2006.01) |
| *B62D 65/12* | (2006.01) |
| *F16C 35/063* | (2006.01) |

(52) U.S. Cl.
CPC .............. *B21J 9/025* (2013.01); *B21J 13/08* (2013.01); *B21J 13/085* (2013.01); *B21K 25/00* (2013.01); *B23P 19/00* (2013.01); *B23P 21/00* (2013.01); *B65G 35/00* (2013.01); *B62D 65/12* (2013.01); *F16C 35/063* (2013.01); *F16C 2326/02* (2013.01)

(58) Field of Classification Search
CPC ........ B21J 13/085; B21K 25/00; B21K 27/00; B23P 19/00; B23P 19/006; B23P 21/00; B65G 35/00
USPC ...................... 198/345.1, 618, 950
See application file for complete search history.

(56) References Cited

U.S. PATENT DOCUMENTS

| | | | | |
|---|---|---|---|---|
| 7,191,633 | B1 * | 3/2007 | Uehara ...................... | B21J 5/02 72/355.6 |
| 7,748,514 | B2 * | 7/2010 | Shimizu ................ | B65G 47/46 198/346.1 |
| 8,397,375 | B2 * | 3/2013 | Mertens ............... | B23Q 7/1426 29/711 |
| 8,561,290 | B2 * | 10/2013 | Yamashita ............. | B23Q 41/02 198/346.2 |
| 8,677,596 | B2 * | 3/2014 | Furukubo .................. | B21J 9/06 29/520 |
| 9,233,408 | B2 * | 1/2016 | Asahi ......................... | B21J 5/10 |
| 10,213,825 | B2 * | 2/2019 | Mori ...................... | B21K 21/08 |
| 10,434,612 | B2 * | 10/2019 | Toyama ............. | B23Q 11/0841 |
| 2013/0181376 | A1 | 7/2013 | Morello et al. | |

FOREIGN PATENT DOCUMENTS

| | | |
|---|---|---|
| DE | 31 30 923 A1 | 2/1983 |
| EP | 0 484 623 A1 | 5/1992 |
| EP | 2039581 A1 | 3/2009 |
| JP | 55-003062 B2 | 1/1980 |
| JP | 55-14186 Y2 | 3/1980 |
| JP | 62-77638 U | 5/1987 |
| JP | 62-183938 U | 11/1987 |
| JP | 2-030350 A | 1/1990 |
| JP | 2-037832 U | 3/1990 |
| JP | 2013-091067 A | 5/2013 |
| JP | 5239933 B2 | 7/2013 |

OTHER PUBLICATIONS

Office Action dated Dec. 2, 2021 from the China National Intellectual Property Administration in CN Application No. 201980018286.7.

International Search Report for PCT/JP2019/005014 dated Mar. 26, 2019 (PCT/ISA/210).

European Search Report for 19 75 3799 dated Apr. 6, 2020.

* cited by examiner

200

CONVEYING SYSTEM, ROTARY FORGING METHOD, ROTARY FORGING APPARATUS, METHOD FOR MANUFACTURING BEARING, METHOD FOR MANUFACTURING VEHICLE, AND METHOD FOR MANUFACTURING MECHANICAL DEVICE

CROSS REFERENCE TO RELATED APPLICATIONS

This application is a National Stage of International Application No. PCT/JP2019/005014 filed Feb. 13, 2019, claiming priority based on Japanese Patent Application No. 2018-023722, filed Feb. 14, 2018.

TECHNICAL FIELD

The present invention relates to a conveying system, a method of performing rotary forging on a workpiece, and the like.

Priority is claimed on Japanese Patent Application No. 2018-023722, filed Feb. 14, 2018, the content of which is incorporated herein by reference.

BACKGROUND ART

For example, in the related art, rotary forging is known as a forging method of minimizing a load to be applied to a workpiece from a forming die. In the rotary forging, a swingingly rotating forming die is pressed against the workpiece to machine the workpiece.

Japanese Patent Application, Publication No. 2013-091067 (Patent Document 1) relates to a rotary forging apparatus for performing the rotary forging on a workpiece, and discloses that a conveying operation of the workpiece with respect to a machining space located below the forming die is performed using a robot.

CITATION LIST

Patent Document

Patent Document 1

Japanese Patent Application, Publication No. 2013-091067

SUMMARY OF INVENTION

Technical Problem

However, the machining space of the rotary forging apparatus is present in an internal space of an exterior. The conveying operation of the workpiece with respect to the machining space is performed through an opening portion through which the internal space and an external space of the exterior communicate with each other. When carrying out such a conveying operation with a robot, the opening portion may be particularly narrow, and design should be performed to prevent an arm of the robot from colliding with the exterior, which causes an increase in the equipment cost of the production line.

An object of the present invention is to provide an apparatus for performing the conveying operation of the workpiece with respect to the machining space, without using an arm of a robot.

Solution to Problem

In an aspect of the present invention, there is provided a conveying system which conveys a workpiece via an opening of a wall disposed between a set area and a machining area, the conveying system including: a base; a guide member provided on the base; a first moving element in which a movement between the set area and the machining area is guided by the guide member; a second moving element which has a workpiece mounted thereon, and is disposed on the first moving element; a support mechanism which supports the second moving element with respect to the first moving element, and has a spring disposed between the first moving element and the second moving element and which supports at least a part of the weight of the second moving element; and a fixing mechanism which fixes the second moving element to the base in the machining area, and has a first mode in which the spring is elastically deformed by applying a predetermined force in addition to the weight of the second moving element and the base and the second moving element are mechanically engaged with each other, and a second mode in which the predetermined force on the spring is released and the mechanical engagement between the base and the second moving element is released.

In another aspect of the present invention, a rotary forging method includes a loading process and a machining process. In the loading process, a moving element holding a workpiece is loaded from an external space of an exterior to an internal space of the exterior in a horizontal direction through an opening portion provided in the exterior constituting a rotary forging apparatus, while being guided a the guide member. In the machining process, after the loading process is completed, rotary forging is performed on the workpiece, using a forming die provided in the internal space.

In still another aspect of the present Invention a rotary forging apparatus includes an exterior, a forming die, a support table, a guide member and a moving element. The exterior has an opening portion through which an internal space and an external space communicate with each other in the horizontal direction. The forming die is for performing a rotary forging process on the workpiece, and is disposed in the internal space. The support table is disposed below the forming die in the internal space. The guide member is supported on the support table, and is provided to extend in the horizontal direction from the internal space to the external space through the opening portion. The moving element is capable of holding the workpiece, is movable in the horizontal direction, while being guided by the guide member between the internal space and the external space through the opening portion, and is capable of positioning the held workpiece below the forming die.

In still another aspect of the present invention, a method of manufacturing a bearing is directed to a bearing equipped with a component having a caulking portion, and the caulking portion of the component is machined by the rotary forging method of the present invention.

In still another aspect of the present invention, a method of manufacturing a vehicle is directed to a vehicle equipped with a hub unit bearing that is a bearing for supporting wheels, and a the hub unit bearing is manufactured by the method of manufacturing a bearing of the present invention.

In still another aspect of the present invention, a method of manufacturing a mechanical device is directed to a mechanical device equipped with a bearing, and the bearing is manufactured by the method of manufacturing a bearing of the present invention. Further, the mechanical device to be manufactured may be of any type of power (the power may be other than human power, and the power may be human power).

Advantageous Effects of Invention

According to the aspects of the present invention, a conveying operation of a workpiece with respect to a machining space can be performed without using the arm of a robot.

BRIEF DESCRIPTION OF DRAWINGS

FIG. 3 is a left side view, and part (c) in FIG. 3 is a right side view.

DESCRIPTION OF EMBODIMENTS

Example 1 of Embodiment

Example 1 of the embodiment will be described using FIGS. 1 to 9.

Figure 1:
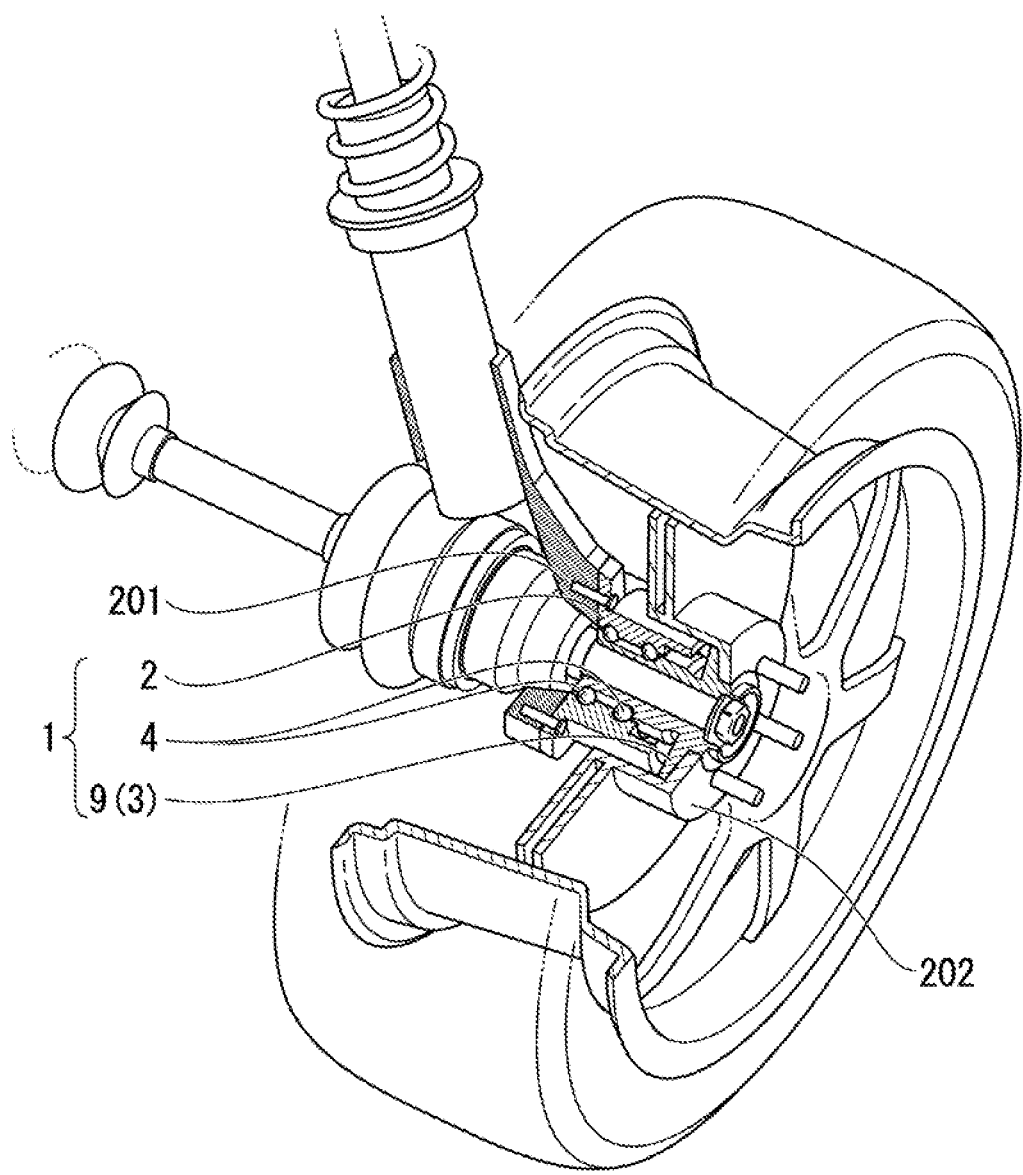
FIG. 1 is a partial schematic view of a vehicle equipped with a hub unit bearing (a bearing unit).

FIG. 1 is a partial schematic view of a vehicle 200 equipped with a hub unit bearing (bearing unit) 1. The present invention can be applied to any of a hub unit bearing for driving wheels and a hub unit bearing for driven wheels. In FIG. 1, the hub unit bearing 1 is for the driving wheels, and includes an outer ring 2, a hub 3, and a plurality of rolling elements 4. The outer ring 2 is fixed to a knuckle 201 of a suspension system, using a bolt or the like. A wheel (and a braking rotating element) 202 is fixed to a flange (a rotating flange) 9 provided on the hub 3, using a bolt or the like. In addition, the vehicle 200 can have the same support structure as described above with respect to the hub unit bearing 1 for the driven wheels.

Figure 2:
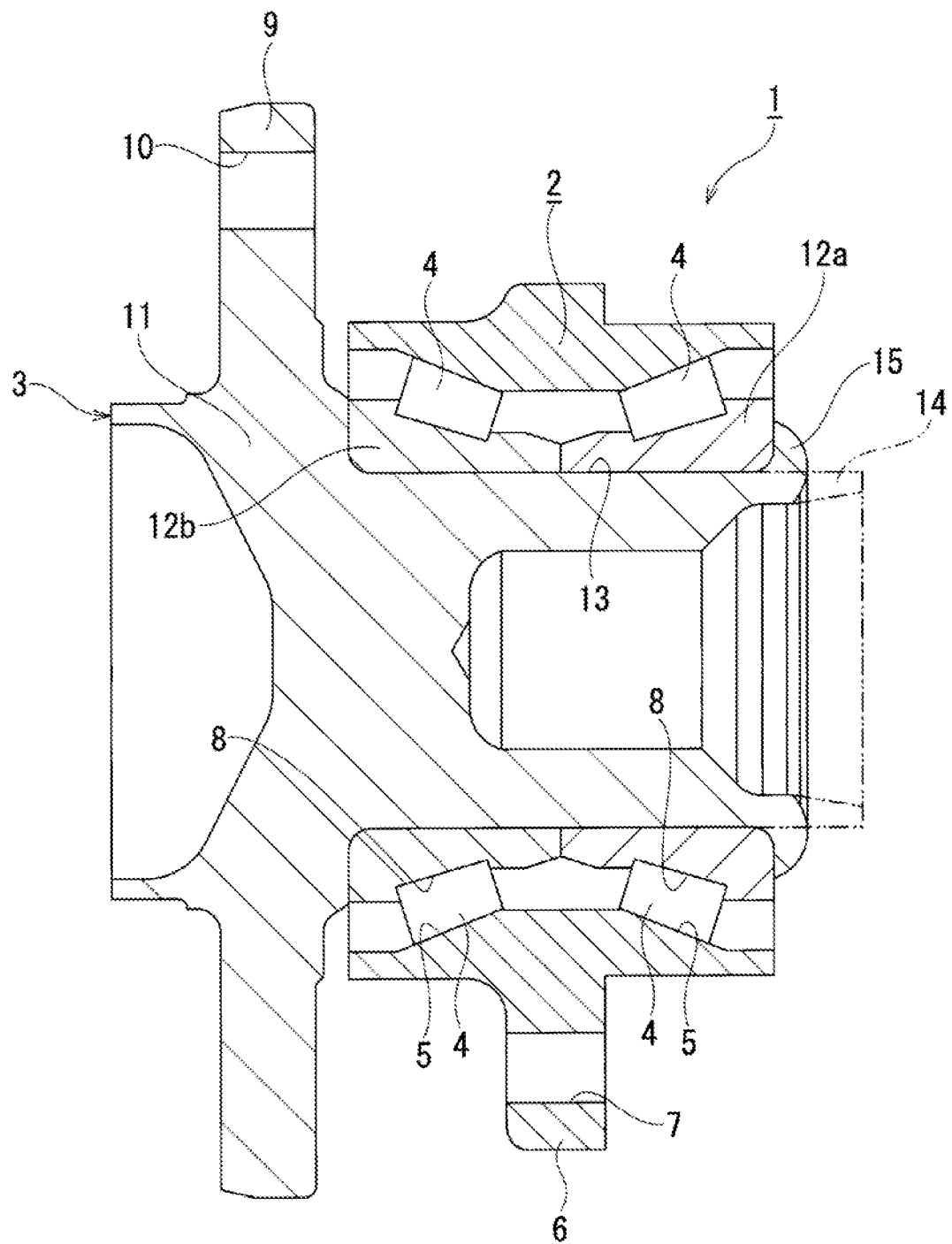
FIG. 2 is a cross-sectional view showing a hub unit bearing which is a target of Example 1 of the embodiment.

FIG. 2 shows the hub unit bearing (bearing unit) 1 for the driven wheels. In the example of FIG. 2, the hub unit bearing 1 includes an outer ring 2, a hub 3, and a plurality of rolling elements 4.

In addition, regarding the hub unit bearing 1, an axial direction outer side is a left side in FIG. 2 which is a width direction outer side of a vehicle in a state of being assembled to the vehicle. The axial direction inner side is a right side in FIG. 2 which is the width direction center side of the vehicle in the state of being assembled to the vehicle.

The outer ring 2 has double-row outer ring raceways 5 on an inner circumferential surface, and has a radially outward protruding stationary flange 6 at an axially intermediate portion. The stationary flange 6 has support holes 7 at a plurality of circumferential positions. The outer ring 2 is coupled and fixed to the knuckle of the suspension system by a bolt inserted or screwed into the support hole 7.

The hub 3 is disposed coaxially with the outer ring 2 on the inner diameter side of the outer ring 2, and has double-row inner ring raceways 8 on the outer circumferential surface. Further, the hub 3 has a rotating flange 9 protruding radially outward at an axially outer portion which protrudes axially outward from the outer ring 2. The rotating flange 9 has mounting holes 10 at a plurality of circumferential positions. The wheel and the braking rotating element are supported and fixed to the rotating flange 9, using a hub bolt press fitted or screwed into the mounting hole 10.

A plurality of rolling elements 4 are disposed between the double-row outer ring raceways 5 and the double-row inner ring raceways 8 for each row in a freely rolling manner. In the shown example, tapered rollers are used as the rolling elements 4. In another example, a ball can be used as the rolling element 4.

In the shown example, the hub 3 has a hub ring (a hub main body, and a unit main body) 11, and a pair of inner rings 12*a* and 12*b*. The double-row inner ring raceways 8 are provided one at a time on the outer circumferential surface of the pair of inner rings 12*a* and 12*b*. The hub ring 11 has a rotating flange 9 at the axially outer portion, and has a cylindrical fitting surface portion 13 in a range from an axially intermediate portion to the axially inner portion of the outer circumferential surface. In the hub 3, in a state in which the pair of inner rings 12*a* and 12*b* are externally fitted to the fitting surface portion 13 of the hub ring 11, the cylindrical portion (shaft end) 14 provided at the axially inner end portion of the hub ring 11 is plastically deformed outward in the radial direction to form a caulking portion 15. The axially inner end surface of the inner ring 12*a* on the axially inner side is held down by the caulking portion 15. A pair of inner rings 12*a* and 12*b* are coupled and fixed to the hub ring 11.

Next, a rotary forging apparatus (a caulking apparatus, a swing caulking apparatus, and a machining apparatus) 16 for machining the cylindrical portion 14 (FIG. 2) of the hub ring 11 into the caulking portion 15 will be described, using FIGS. 3 to 9. Part (a) in FIG. 3 shows a front view (front view) of the rotary forging apparatus 16, part (b) in FIG. 3 shows a left side view thereof, and part (c) in FIG. 3 shows a right side view thereof.

The rotary forging apparatus 16 includes an exterior (a casing, and a wall) 17, a forming die 18, a support table (a base) 19, a guide member 20, a moving element 21, a moving element driving apparatus 47, a fixing mechanism 22, an outer ring driving apparatus 49, and a stopper 50. The rotary forging apparatus 16 includes a conveying system 100. The conveying system 100 conveys the workpiece via an opening 25 of a wall 17 disposed between a machining area (an internal space 23) and a set area (a replacement area, and an external space).

Figure 3:
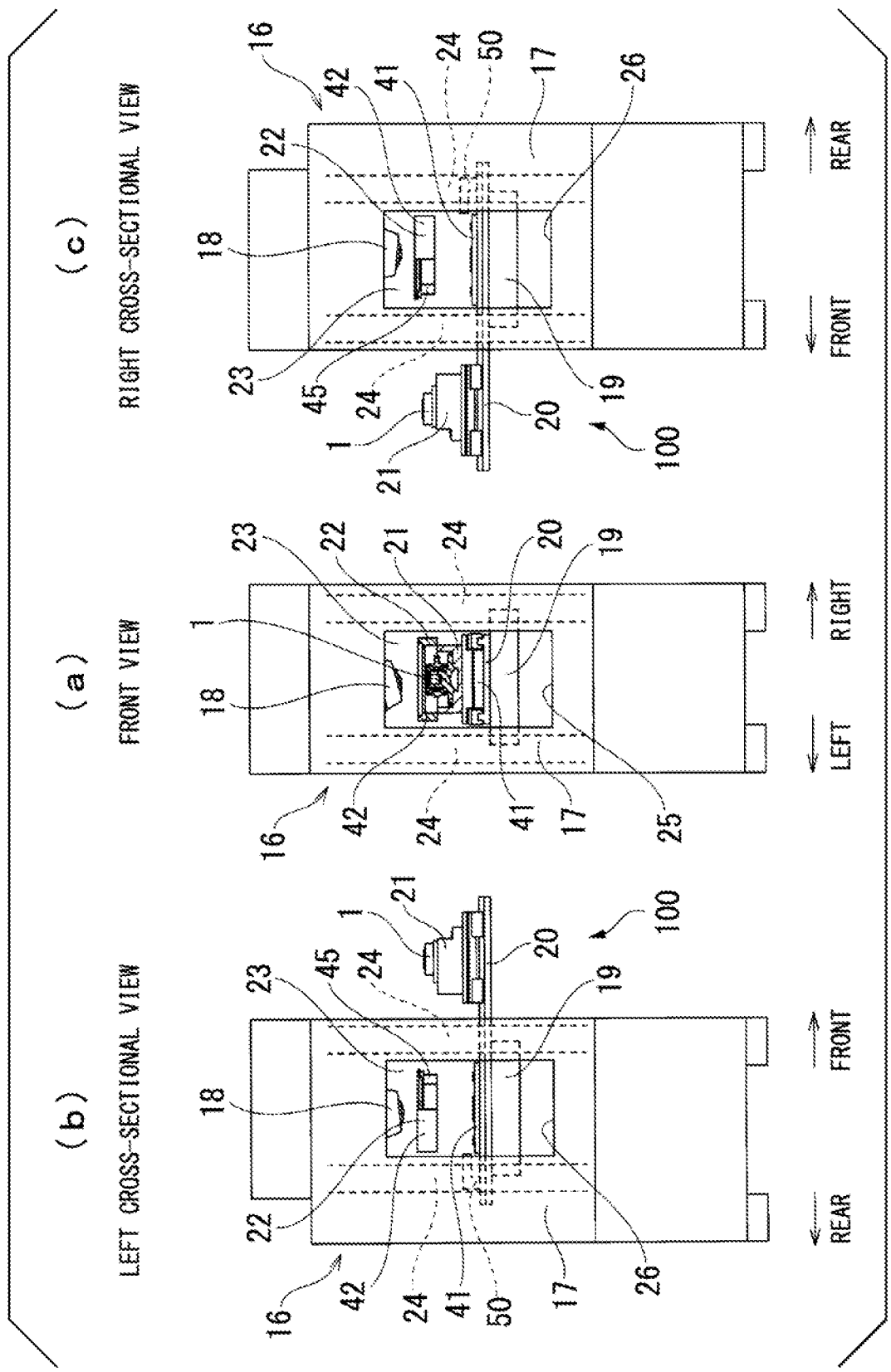
FIG. 3 is a view showing a rotary forging apparatus according to Example 1 of the embodiment. Specifically, part (a) in FIG. 3 is a front view, part (b) is

The exterior 17 is configured in a vertically long rectangular box shape by combining a plurality of frames (skeleton members) and a plurality of covers (cover members such as panels, and wall members), as schematically shown in part (a) to (c) in FIG. 3, and has an internal space 23. The plurality of frames constituting the exterior 17 includes four column frames 24 disposed in a vertical direction at each of four corners of the exterior 17 in a horizontal direction. The exterior 17 has a rectangular front surface side opening portion (an opening) 25 elongated in the vertical direction on the wall between the two column frames 24 on the front side. The wall between the two column frames 24 on the left side and the wall between the two column frames 24 on the right side have rectangular side surface side opening portions 26 elongated in the vertical direction. The internal space 23 of the exterior 17 and the external space communicate with each other in a horizontal direction through the front surface side opening portion 25 and the side surface side opening portion 26.

Figure 4:
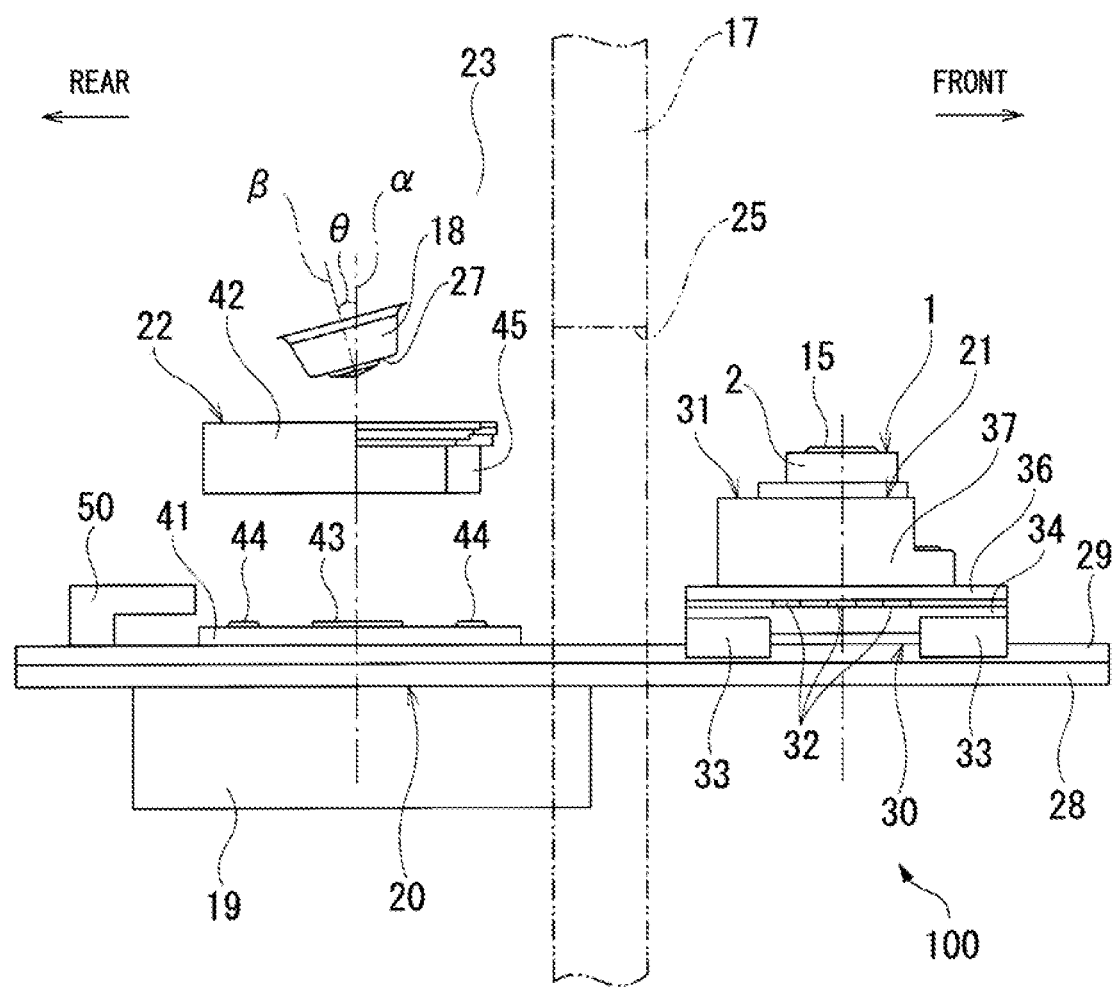
FIG. 4 is a partial side view of the rotary forging apparatus relating to Example 1 of the embodiment, showing a moving element holding a hub unit bearing in a state of being located in an external space of an exterior.
Figure 5:
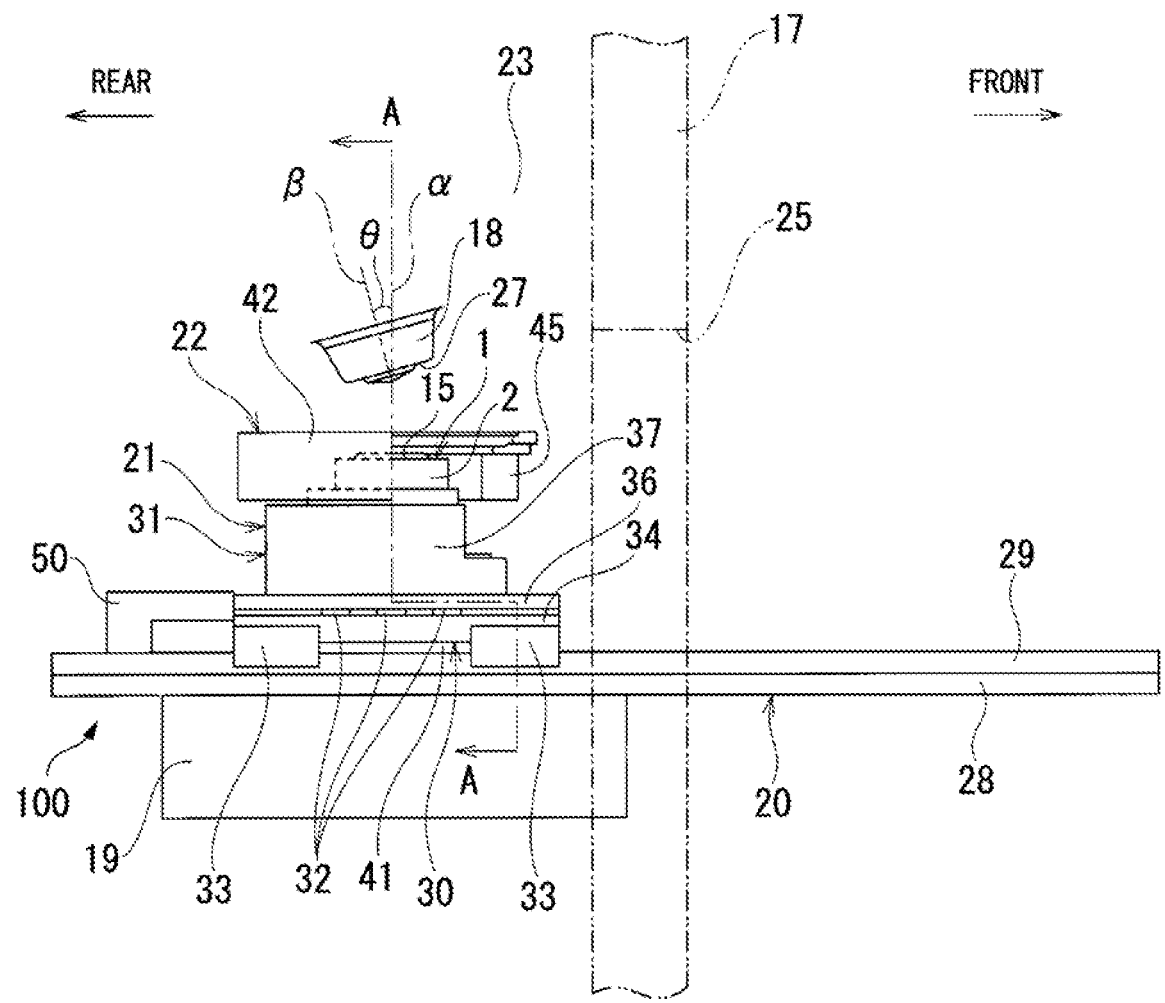
FIG. 5 is a partial side view of the rotary forging apparatus relating to Example 1 of the embodiment, shown in a state in which the moving element holding the hub unit bearing is located below a forming die in the internal space of the exterior, before the moving element is fixed to a support table.
Figure 6:
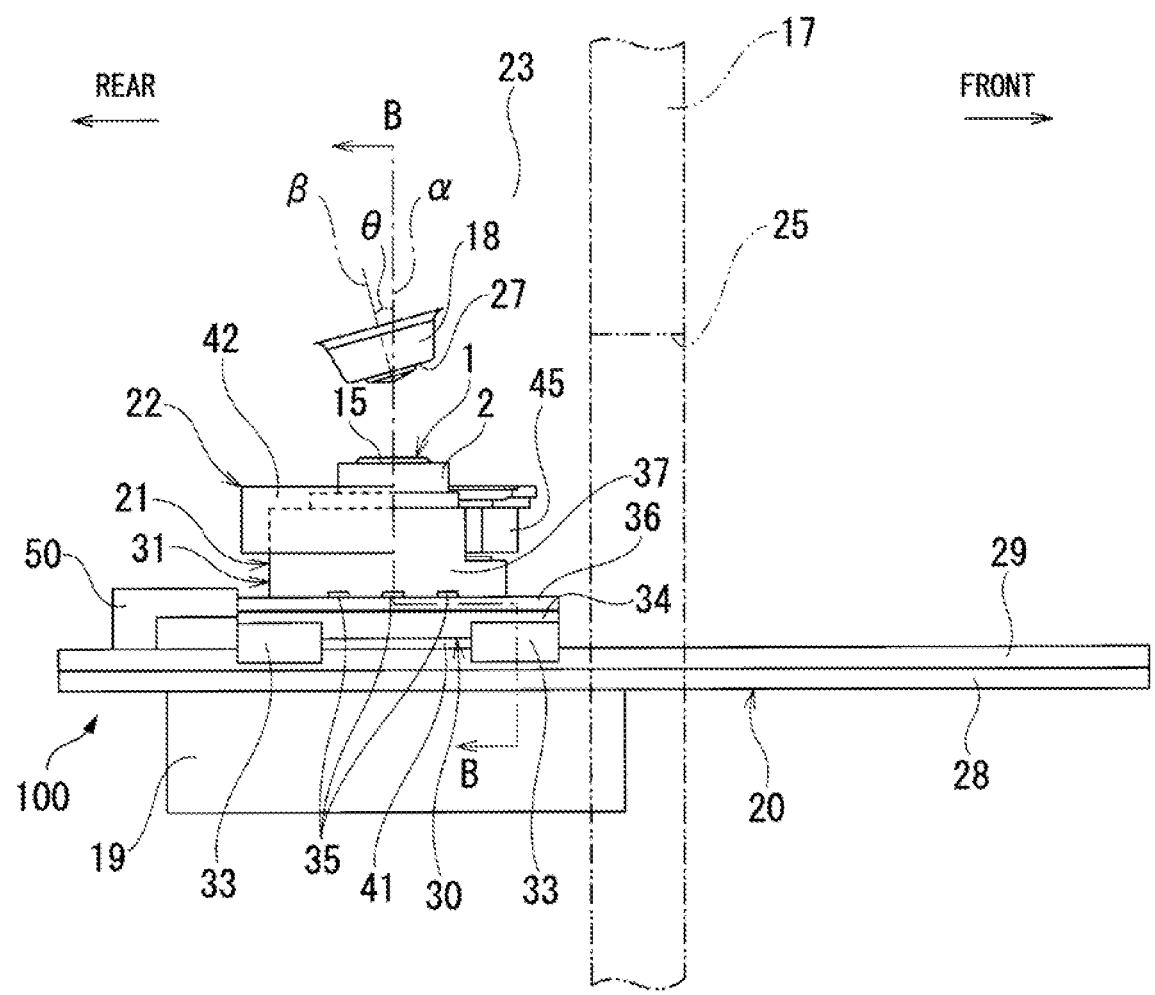
FIG. 6 is a partial side view of the rotary forging apparatus relating to Example 1 of the embodiment, shown in a state in which the moving element holding the hub unit bearing is located below the forming die in the internal space of the exterior, after the moving element is fixed to a support table.
Figure 7:
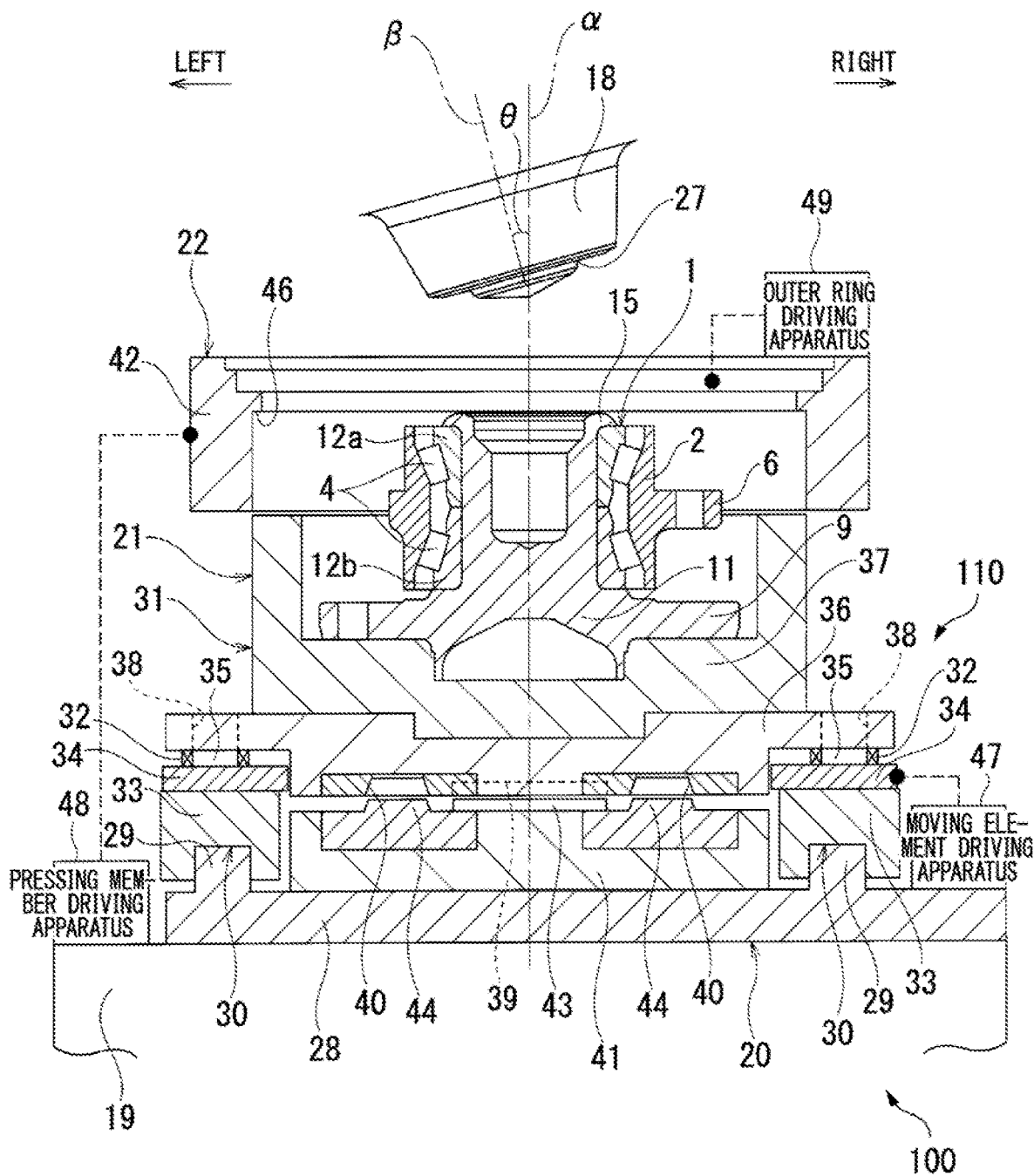
FIG. 7 is an enlarged cross-sectional view taken along the line A-A of FIG. 5.
Figure 8:
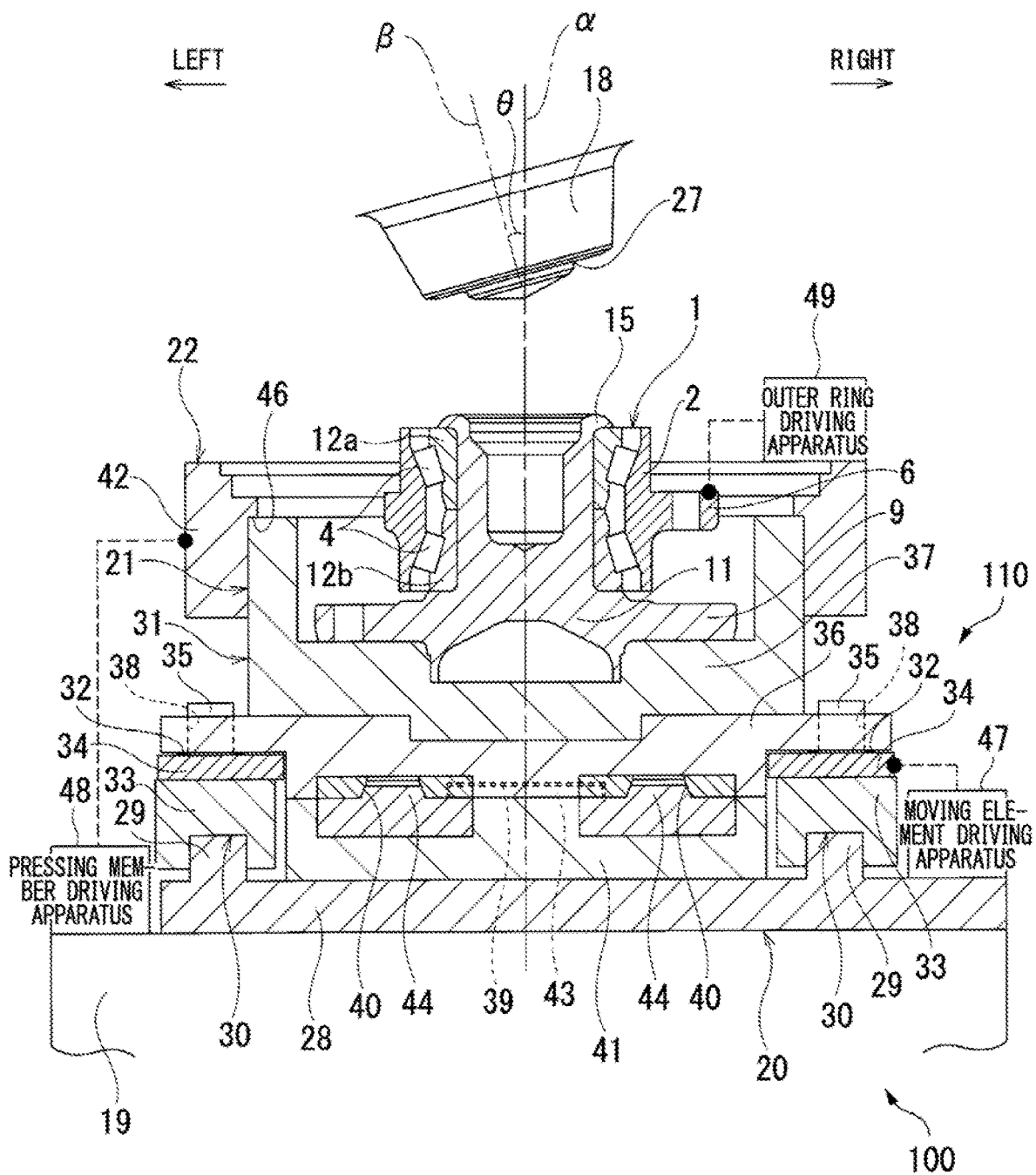
FIG. 8 is an enlarged cross-sectional view taken along the line B-B of FIG. 6.
Figure 9:
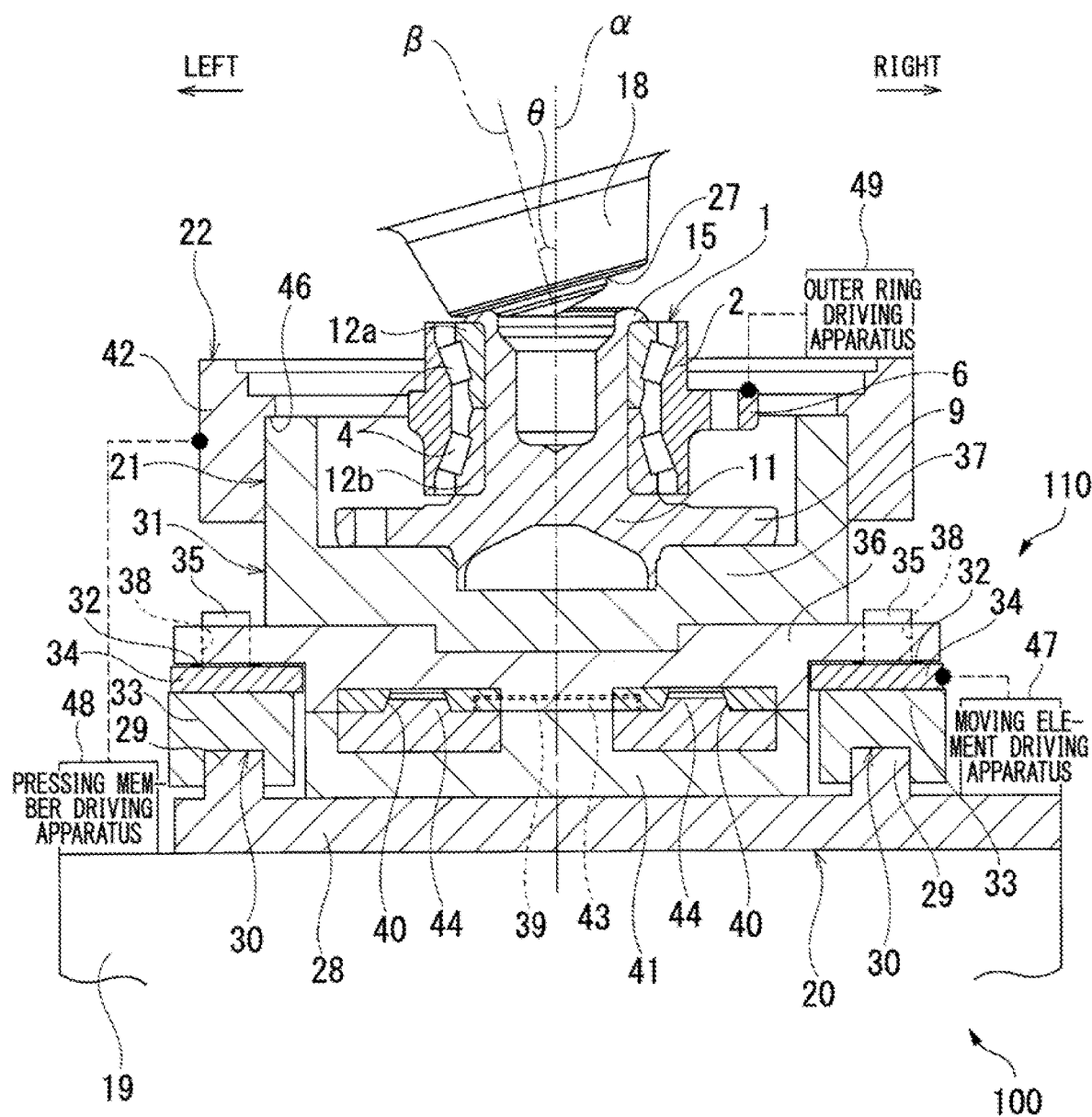
FIG. 9 is a cross-sectional view showing a state in which the forming die abuts the axially inner end portion of a hub ring constituting the hub unit bearing in a state shown in FIG. 8 to perform machining of a caulking portion.

Here, a relationship of FIGS. 4 to 9 referred to in the following description will be briefly described (the detailed description will be given later). FIG. 4 is an enlarged view of a part of FIG. 3(b), and shows a state in which the moving element 21 holding the hub unit bearing 1 is located in the external space of the exterior 17. In FIG. 4, only a part of the exterior 17 is shown by a virtual line (a two-dotted chain line), and the remaining parts are not shown. FIG. 5 shows a state in which the moving element 21 holding the hub unit bearing 1 horizontally moves in the state shown in FIG. 4 to the internal space 23 along the guide member 20. FIG. 6 shows a state in which the moving element 21 is fixed to the support table 19 by lowering the pressing member 42 constituting the fixing mechanism 22 in the state shown in FIG. 5. FIG. 7 is an enlarged cross-sectional view taken along line A-A of FIG. 5. FIG. 8 is an enlarged cross-sectional view taken along the line B-B of FIG. 6. FIG. 9 shows a state in which the support table 19 on which the moving element 21 or the like is mounted rises from the state shown in FIG. 8, and the axially inner end portion of the hub ring 11 constituting the hub unit bearing 1 abuts the forming die 18.

The forming die 18 is a tool for forming the caulking portion 15 by performing rotary forging on the cylindrical portion 14 (FIG. 2) of the hub ring 11, and is disposed in the upper portion of the internal space 23 of the exterior 17. The forming die 18 has a main axis α in the vertical direction and a rotation axis β inclined by a predetermined angle θ with respect to the main axis α, and has an annular machining surface portion 27 centered on the rotation axis β at a tip end portion (a lower end portion). Such a forming die 18 is capable of rotating (oscillational rotating) about the main axis α with a forming die electric motor (not shown) as a drive source, and freely rotates about the rotation axis β.

When forming the caulking portion 15 by performing rotary forging on the cylindrical portion 14 (FIG. 2) of the hub ring 11, the support table (base) 19 moves the hub unit bearing 1 in the vertical direction with respect to the forming die 18. The support table 19 is disposed below the forming die 18 in the internal space 23 of the exterior 17. The support table 19 can be moved (lifted) in the vertical direction by a support table hydraulic cylinder (not shown).

The guide member 20 is supported on the support table 19. The guide member 20 is provided to extend in the horizontal direction from the internal space 23 of the exterior 17 to the external space of the exterior 17 through the front surface side opening portion 25 of the exterior 17. The moving element 21 is capable of holding the hub unit bearing 1 which is a workpiece. The moving element 21 is movable in the horizontal direction through the front surface side opening portion 25 of the exterior 17, while being guided by the guide member 20 between the internal space 23 of the exterior 17 and the external space. The moving element 21 can position the held hub unit bearing 1 below the forming die 18 (a machining space). In addition, the moving element 21 moves along the guide member 20 using the driving force applied from the moving element driving apparatus (driving device) 47 (shown only in FIGS. 7 to 9 in a block diagram).

The guide member 20 includes a base plate portion (base) 28 and a pair of guide rails (guide members) 29. Alternatively, two guide rails (guide members) 29 are provided on the support table 19 or the base plate portion 28 as a base.

The base plate portion 28 has a rectangular flat plate shape (a band plate shape) in which the front-rear direction of the rotary forging apparatus 16 is set as a longitudinal direction and the left-right direction of the rotary forging apparatus 16 is set as a lateral direction. The base plate portion 28 is located below the forming die 18 in a state in which a rear side in the longitudinal direction is fixed to an upper surface of the support table 19. In the base plate portion 28, the front side in the longitudinal direction protrudes to the external space of the exterior 17 through the front surface side opening portion 25 of the exterior 17.

The pair of guide rails 29 are straight rails parallel to each other. The guide rails 29 are fixed to both side portions in the lateral direction (left-right direction) of the upper surface of the base plate portion 28, and are provided over the entire length of the base plate portion 28. Thus, the pair of guide rails 29 also have a rearward side portion in the longitudinal direction located below the forming die 18, and a forward side portion in the longitudinal direction protruding to the external space of the exterior 17 through the front surface side opening portion 25 of the exterior 17.

The moving element 21 is configured by combining a plurality of components. Specifically, the moving element 21 includes, as the constituent components, a moving element base portion (a first moving element) 30 guided by the guide member 20, a moving element holding portion (a second moving element) 31 capable of holding the hub unit bearing 1, and a spring 32 for supporting the moving element holding portion 31 with respect to the moving element base portion 30 to float it. That is, the spring 32 supports the moving element holding portion 31 with respect to the moving element base portion 30, and allows a downward displacement of the moving element holding portion 31 with respect to the moving element base portion 30 by its own elastic deformation.

The moving element base portions (the first moving element) 30 are provided one by one for each guide rail 29. Each moving element base portion 30 is also configured by combining a plurality of components. Specifically, each of the moving element base portions 30 includes a pair of guide blocks 33 and a support plate 34 as its constituent components. The pair of guide blocks 33 are disposed to be spaced apart in the longitudinal direction of the guide rail 29. Each of the guide blocks 33 is disposed in engagement with the guide rail 29, and the guide block 33 is movable along the guide rail 29. The movement of the moving element base portion (the first moving element) 30 between the machining area and the set area is guided by the guide rail (the guide member) 29. Both end portions in the front-rear direction of the support plate 34 are fixed to the upper surfaces of the pair of guide blocks 33 in a state in which the support plate 34 bridges to the pair of guide blocks 33. Guide pins 35 protruding upward from the upper surface of the support plate 34 are fixed to a plurality of locations (three locations in this example) in the front-rear direction of the support plate 34.

The moving element holding portion (the second moving element) 31 is also configured by combining a plurality of components. Specifically, the moving element holding portion 31 includes a moving table 36 and a receiving die 37 as its constituent components. A workpiece is mounted on the moving element holding portion (the second moving element) 31. The moving element holding portion 31 is disposed on the moving element base portion (the first moving element) 30.

The moving table 36 is configured in a substantially rectangular plate shape. The moving table 36 has guide holes 38 penetrating in the vertical direction at a plurality of locations in the front-rear direction (locations aligned with the guide pins 35) at both end portions in the left-right direction. The guide pin 35 fixed to the support plate 34 of the pair of moving element base portions 30 is inserted through each of the guide holes 38. Therefore, the displacement direction of the moving table 36 (the moving element holding portion 31) with respect to the pair of moving element base portions 30 is restricted substantially only in the vertical direction. Further, the moving table 36 has a central depressed portion 39, which is a moving element side engaging portion, at the central portion of the lower surface. The inner circumferential surface of the central depressed portion 30 is simply a cylindrical surface in which an inner diameter does not change in the vertical direction. Further, the moving table 36 has a tapered depressed portion 40, which is the moving element side engaging portion, at a plurality of locations (in the present example, four locations in all directions located between the pair of moving element base portions 30 in the left-right direction) in the lower surface deviated from the central depressed portion 39. The inner circumferential surface of the tapered depressed portion 40 is a conical surface in which an inner diameter increases as it goes downward.

A receiving die 37 is formed in a bottomed cylindrical shape in which an upper end is open, and is fixed to the central portion of the upper surface of the moving table 36. The receiving die 37 has a shape in which the hub ring 11 can be coaxially mounted in a state in which the upper surface of the bottom plate portion faces the axial outer end portion of the hub ring 11 constituting the hub unit bearing 1 in a downward direction.

The spring 32 is, for example, a coil spring, a laminated disc spring, a ring spring or the like. The spring 32 is sandwiched between the upper surface of the support plate 34 and the tower surface of the moving table 36 in a state of being loosely fitted to each of the guide pins 35. In this state, the moving element holding portion 31 is supported by the springs 32 with respect to the pair of moving element base portions 30 to float it. That is, the moving element holding portion 31 is lifted by a predetermined amount from the upper surface of the support plate 34 of the pair of moving element base portions 30 by the elasticity of the spring 32. Also, in this state, when the force directed downward is applied, the moving element holding portion 31 is allowed to be displaced downward on the basis of the elastic deformation of the spring 32 (the dimension in the vertical direction is reduced elastically). However, for example, when the weight of the hub unit bearing 1 or the weight of a person (for example, 100 kg) is applied to the moving element holding portion 31, the strength of the spring 32 is adjusted so that the moving element holding portion 31 is not displaced substantially downward. The moving element holding portion (the second moving element) 32 is supported by the support mechanism 110 with respect to the moving element base portion (the first moving element) 30. In an example, the support mechanism 110 has a spring 32, a guide pin 35, and a guide hole 38. The spring 32 is disposed between the moving element base portion 30 and the moving element holding portion 31, and supports the weight of at least a part of the moving element holding portion 31. The support mechanism 110 allows the movement of the moving element holding portion (the second moving element) 31 with respect to the moving element base portion (the first moving element) 30 in the direction in which the elastic force of the spring 32 acts, and mechanically restricts the movement of the moving element holding portion (the second moving element) 31 with respect to the moving element base portion (the first moving element) 30 in other directions. Further, in the case of implementing the present invention, the spring 32 can also be provided at a position away from the guide pin 35 without being externally fitted to the guide pin 35. The number of springs 32 is not particularly limited, and an appropriate number can be adopted.

The moving element driving apparatus 47 is configured to include a ball nut fixed to the moving element base portion 30, a ball screw shaft in which the ball nut is screwed through a plurality of balls, and a moving element electric motor which rotationally drives the ball screw shaft. The moving element 21 moves along the pair of guide rails 29 on the basis of the rotation of the ball screw shaft by the moving element electric motor. When implementing the present invention, for example, a belt type that uses the moving element electric motor as a driving source, an air cylinder, or the like can be adopted as the moving element driving apparatus 47.

The fixing mechanism 22 is configured to include the central depressed portion (the first depressed portion) 39 and the tapered depressed portion (the second depressed portion) 40 described above, a backup plate 41, a pressing member 42 serving as a displacement force applying member, and a pressing member driving apparatus 48. The moving element 21 (the moving element holding portion 31) is held by and fixed to the support table 19 or the base plate portion 28 serving as a base by the fixing mechanism 22 in the machining area. The fixing mechanism 22 has a first mode and a second mode. In the first mode, the spring 32 is elastically deformed by applying a predetermined force in addition to the weight of the moving element holding portion (the second moving element) 31, and the support table 19 or the base plate portion 28 as a base, and the moving table 36 (the moving element holding portion (the second moving element) 31) are mechanically engaged with each other. In the second mode, a predetermined force on the spring 32 is opened (released), and mechanical engagement between the base (the support table 19 or the base plate portion 28) and the moving table 36 (the moving element holding portion (the second moving element) 31) is opened (released).

The backup plate 41 is formed in a rectangular flat plate shape. The backup plate 41 is disposed coaxially with the main axis α of the forming die 18 below the forming die 18 in the internal space 23 of the exterior 17. The backup plate 41 is fixed to a portion between the pair of guide rails 29 on the upper surface of the base plate portion 28 forming the guide member 20.

The backup plate 41 has a central protrusion portion (a first protrusion portion) 43 which is a support table side engaging portion at the central portion of the upper surface aligned with the central depressed portion (the first depressed portion) 39 provided on the lower surface of the moving table 36. The backup plate 41 has a tapered protrusion portion (a second protrusion portion) 44 which is a support table side engaging portion, at a plurality of locations on the upper surface aligned with each of the tapered depressed portions (the second depressed portions) 40 provided on the lower surface of the moving table 36. The upper end surface of the central protrusion portion 43 is located in the same imaginary horizontal plane as the upper end surface of the tapered protrusion portion 44 or is located slightly below the imaginary horizontal plane. The lower surface of the moving table 36 is located above the imaginary horizontal plane in a state before the moving element holding portion 31 is displaced downward by a pressing member 42 as will be described later.

The outer circumferential surface of the tapered protrusion portion 44 has a conical surface in which the outer diameter decreases as it goes upward. In addition, apex angles (taper angles) of the conical surface, which is the outer circumferential surface of the tapered protrusion portion 44 and the conical surface, which is the inner circumferential surface of the tapered depressed portion 40, are the same. Thus, the conical surfaces can be taper-fitted to each other. An inclined outer circumferential surface of the protrusion portion 44 and an inclined inner circumferential surface of the depressed portion 40 are in surface contact with each other, and the protrusion portion 44 is inserted to fit in the depressed portion 40. The inclination angles of the protrusion portion 44 and the depressed portion 40 with respect to the central axis are equal to each other. By the fitting, the moving table 36 (the moving element holding portion (the second moving element) 31) is positioned with respect to the backup plate 41 provided on the base plate portion 28 as a base. On the other hand, the outer circumferential surface of the central protrusion portion 43 has simply a cylindrical surface in which outer diameter does not change in the vertical direction. The outer circumferential surface of the protrusion portion 43 has a circumferential surface parallel to the central axis. Further, the central protrusion portion 43 has an outer diameter dimension slightly smaller than the inner diameter dimension of the central depressed portion 39. Thus, the central protrusion portion 43 does not interfere with the opening peripheral edge portion of the central depressed portion 39 when the tapered protrusion portion 44 and the tapered depressed portion 40 are taper-fitted to each other, and the central protrusion portion 43 can be cylindrical surface-fitted to the central depressed portion 39 with clearance fitting. Further, in the case of implementing the present invention, the number of combinations (the number of pairs) of the tapered depressed portion 40 and the tapered protrusion portion 44 is not particularly limited, and an appropriate number can be adopted. Further, in the case of implementing the present invention, it is possible to adopt a configuration in which the central protrusion portion 43 and the tapered protrusion portion 44 are provided directly on the support table 19, instead of a configuration of providing them indirectly on the support table 19 (provided on other members such as the backup plate 41 fixed to the support table 19) as in this example. The machining area in the internal space 23 includes a machining axis (a center vertical axis, a machining center axis, and a machining center position) (α) disposed between the two guide rails 29. The fixing mechanism 22 has at least three engagement pairs (40, 44) and (39, 43) used for mechanical engagement between the support table 19 or the base plate portion 28 as a base and the moving table 36 (the moving element holding portion (the second moving element) 31). At least three engagement pairs (40, 44) and (39, 43) have a first pair (39, 43) disposed at a position corresponding to the machining axis (α), and at least two second pairs (40, 44) disposed between the two guide rails 29 and disposed to surround the first pair (39, 43). Each of the at least two second pairs (40, 44) has a combination of a tapered depressed portion 40 and a tapered protrusion portion 44. In an example, at least a part of the tapered depressed portion 40 and at least a part of the tapered protrusion portion 44 are disposed within the range of the exterior of the workpiece in the direction orthogonal to the machining axis (α), in the direction orthogonal to the machining axis (α), a forged portion and a second pair (the tapered depressed portion 40 and a tapered protrusion portion 44) in the workpiece are disposed between the machining axis (α) and the guide rail 29, and at least a part of the second pair (the tapered depressed portion 40 and the tapered protrusion portion 44) is disposed between the forged portion and the guide rail 29. By appropriate arrangement of the mechanical engaging portion, reliable holding of the moving element holding portion (the second moving element) 31 on which the workpiece is mounted is maintained even when machining.

The pressing member 42 is configured in a segmental cylindrical shape having a discontinuous portion 45 at one location in the circumferential direction, and has a stepped surface 46 capable of coming into contact with the upper end surface of the receiving die 37 at the axially intermediate portion of the inner circumferential surface. The discontinuous portion 45 has a circumferential width that allows the axial inner portion of the hub unit bearing 1 to pass in the radial direction. Such a pressing member 42 positions the discontinuous portion 45 in the forward direction, and is arranged coaxially with the main axis α of the forming die 18 between the forming die 18 and the guide member 20 in the vertical direction in the state in which the stepped surface 46 is directed downward.

The pressing member driving apparatus 48 (shown only in FIGS. 7 to 9 in a block diagram) supports the pressing member 42 to be movable in the vertical direction with respect to the support table 19. As such pressing member driving apparatus 48, for example, it is possible to adopt apparatus including one or more (for example, one to three) pressing hydraulic cylinders fixed to the upper surface of the support table 19 and coupled to the pressing member 42.

The outer ring driving apparatus 49 (shown only in FIGS. 7 to 9 in a block diagram) is supported by the pressing member 42. The outer ring driving apparatus 49 rotates the outer ring 2 with respect to the hub ring 11 and the inner rings 12a and 12b when performing rotary forging on the cylindrical portion 14 (FIG. 2) of the hub ring 11 to form the caulking portion 15. As such an outer ring driving apparatus 49, for example, it is possible to adopt apparatus including a rotating element engageable with the outer ring 2 and an outer ring electric motor for rotating the rotating element with the outer ring 2.

The stopper 50 is fixed to the rear end portion of the guide member 20 in the longitudinal direction. The stopper 50 is intended to position the moving element 21 in the front-rear direction by abutting the rear end portion of the moving element 21 moving from the front to the rear along the pair of guide rails 29. The moving element 21 is disposed coaxially with the main axis α of the forming die 18 in a state in which positioning of the moving element 21 is intended in the front-rear direction as described above. That is, the receiving die 37 constituting the moving element 21 and the hub ring 11 of the hub unit bearing 1 held by the receiving die 37 are disposed coaxially with the main axis α of the forming die 18. Further, the central depressed portion 39 provided on the lower surface of the moving table 36 is aligned with the central protrusion portion 43 provided on the upper surface of the backup plate 41, and the tapered depressed portion 40 provided on the lower surface of the moving table 36 is aligned with the tapered protrusion portion 44 provided on the upper surface of the backup plate 41.

A rotary forging method {a method of performing rotary forging on the cylindrical portion 14 (FIG. 2) of the hub ring 11 constituting the hub unit bearing 1} using the rotary forging apparatus 16 will be described below.

In the rotary forging method of the present embodiment, a set process, a loading process, a fixing process, a machining process, a fixing releasing process, an unloading process, and an extracting process are sequentially performed.

FIGS. 3 to 9 show the hub unit bearing 1 in a state in which the caulking portion 15 is formed at the axially inner end portion of the hub ring 11 for convenience. However, in actual, in the state before performing the machining of the caulking portion 15 to be described later, at the axially inner end portion of the hub ring 11, the cylindrical portion 14 (FIG. 2) is present and the caulking portion 15 is not formed.

(Set Process)

The set process is a process of setting the hub unit bearing 1 immediately before forming the caulking portion 15 (the hub unit bearing 1 shown in FIG. 2 and having the cylindrical portion 14 before formation of the caulking portion 15 at the axially inner end portion of the hub ring 11 as shown by a chain line in FIG. 2) on the moving element 21.

In the set process, as shown in FIGS. 3 and 4, the moving element 21 is disposed in the external space of the exterior 17. Further, the support table 19 is sufficiently lowered with respect to the forming die 18. Further, by raising the pressing member 42 with respect to the support table 19, the lower end surface of the pressing member 42 is positioned above the upper end surface of the moving element holding portion 31 which constitutes the moving element 21. Further, in this state, the hub unit bearing 1 is held by the moving element 21. Specifically, as shown in FIG. 7, the hub ring 11 is coaxially mounted on the upper surface of the bottom plate portion of the receiving die 37 in the state in which the axially outer end portion of the hub ring 11 is directed downward. In this way, in the state in which the hub unit bearing 1 is held by the moving element 21, the axially inner portion of the hub unit bearing 1 protrudes upward from the upper end edge of the receiving die 37. In this way, the operation of holding the hub unit bearing 1 on the moving element 21 can be performed with the hand of the operator or automatically by the arm of the robot.

(Loading Process)

The loading process is a process of loading the moving element 21 holding the hub unit bearing 1 from the external space of the exterior 17 into the internal space 23 of the exterior 17.

In the loading process, as shown in FIG. 4 to FIG. 5, the moving element 21 holding the hub unit bearing 1 is moved rearward while being guided by the pair of guide rails 29 constituting the guide member 20, and is loaded from the external space of the exterior 17 to the internal space 23 of the exterior 17 in the horizontal direction through the front surface side opening portion 25 provided in the exterior (the wall of the exterior) 17. By bringing the rear end portion of the loaded moving element 21 into contact with the stopper 50, the movement of the moving element 21 is stopped below the forming die 18. Thus, the hub ring 11 of the hub unit bearing 1 is disposed coaxially with the main axis α of the forming die 18. Further, when loaded, the axially inner portion of the hub unit bearing 1 protruding upward from the upper end edge of the receiving die 37 passes through the discontinuous portion 45 of the pressing member 42 to enter the inner diameter side of the pressing member 42.

(Fixing Process)

The fixing process is a process of fixing the moving element 21 to the support table 19. In the fixing process, as shown in FIG. 5 to FIG. 6 (from FIG. 7 to FIG. 8), the pressing member 42 constituting the fixing mechanism 22 is lowered, and the upper end surface of the receiving die 37 is pressed by the stepped surface 46 of the pressing member 42. Thus, the moving element holding portion 31 is displaced downward by elastically deforming the spring 32 (elastically reducing the size of the spring 32 in the vertical direction), Further, the lower surface of the moving table 36 constituting the moving element holding portion 31 is brought into contact with the upper surface of the backup plate 41. At the same time, the central protrusion portion 43 provided on the upper surface of the backup plate 41 is cylindrical-fitted to the central depressed portion 39 provided on the lower surface of the moving table 36 with a clearance fit, and the tapered protrusion portion 44 provided on the upper surface of the backup plate 41 is taper-fitted to each of the tapered depressed portions 40 provided on the lower surface of the moving table 36 without rattling. As a result, the moving element 21 is fixed to the support table 19 via the backup plate 41 and the guide member 20.

In the present embodiment, the amount of descent of the pressing member 42 and the amount of downward displacement of the moving element bolding portion 31 when performing the fixing process can be reduced as much as possible. For this purpose, specifically, the interval in the vertical direction between the lower end surface of the pressing member 42 and the upper end surface of the receiving die 37 in the state before the pressing member 42 is lowered, and the interval in the vertical direction between the lower surface of the moving table 36 and the upper end surface of the tapered protrusion portion 44 in the state before the moving element holding portion 31 is displaced downward are to be sufficiently small (for example, about 0.5 mm to 1 mm).

(Machining Process)

The machining process is a process of forming the caulking portion 15 by performing rotary forging on the cylindrical portion 14 (FIG. 2) of the hub ring 11 constituting the hub unit bearing 1. In the machining process, the outer ring driving apparatus 49 supported by the pressing member 42 is engaged with the outer ring 2 of the hub unit bearing 1 in a state in which the moving element holding portion 31 is displaced downward as described above. Further, the outer ring 2 is rotated with respect to the hub ring 11 and the inner rings 12a and 12b by the outer ring driving apparatus 49. At the same time, the forming die 18 is pivoted and rotated about the main axis α.

In this state, as shown in FIG. 8 to FIG. 9, the support table 19 is lifted to press the machining surface portion 27 of the forming die 18 against the cylindrical portion 14 (FIG. 2) of the hub ring 11. As a result, a load directed downward in the vertical direction and outward in the radial direction is applied from the forming die 18 to a part of the cylindrical portion 14 in the circumferential direction. In this way, the position at which the load is applied to the cylindrical portion 14 changes continuously in the circumferential direction of the cylindrical portion 14 with rotation of the forming die 18 about the main axis α. As a result, the cylindrical portion 14 is plastically deformed outward in the radial direction to form the caulking portion 15, and the axially inner end surface of the inner ring 12a on the axially inner side is restrained by the caulking portion 15. When forming the caulking portion 15 in this manner, the forming die 18 swings and rotates around the main axis α, while rotating on the rotation axis β on the basis of the frictional force acting on the portion in contact with the cylindrical portion 14 (the caulking portion 15). That is, the contact of the forming die 18 with the cylindrical portion 14 (the caulking portion 15) is a rolling contact. Therefore, a wear or a heat generation of the contact portion can be sufficiently suppressed.

Further, 10% to 100% of the load applied from the forming die 18 to the cylindrical portion 14 (the caulking portion 15) during machining of the caulking portion 15 is a load directed outward in the radial direction. If such a load directed outward in the radial direction is supported only by the tapered fitting portion between the tapered depressed portion 40 and the tapered protrusion portion 44, the load on the tapered fitting portion becomes too large. For this reason, in this example, the load directed outward in the radial direction as described above is also supported by the cylindrical surface fitting portion between the central depressed portion 39 and the central protrusion portion 43, and the load on the taper fitting can be reduced.

After the formation of the caulking portion 15 is completed, as shown in FIG. 9 to FIG. 8, the hub unit bearing 1 is retracted downward from the forming die 18 by lowering the support table 19, and the rocking rotation of the forming die 18 and the rotation of the outer ring 2 are stopped.

(Fixing Release Process)

In the fixing release process, as shown in FIG. 8 to FIG. 7 (FIG. 6 to FIG. 5), the engagement of the outer ring driving apparatus 49 with respect to the outer ring 2 is released by raising the pressing member 42, and by displacing the moving element holding portion 31 upward with elasticity of the spring 32, the fixed state of the moving element holding portion 31 with respect to the support table 19 is released.

(Unloading Process)

The unloading process is a process of unloading the moving element 21 holding the hub unit bearing 1 from the internal space 23 of the exterior 17 to the external space of the exterior 17. In the unloading process, as shown in FIG. 5 to FIG. 4, the moving element 21 holding the hub unit bearing 1 is moved forward while being guided by the pair of guide rails 29 constituting the guide member 20, and is unloaded from the internal space 23 of the exterior 17 to the external space of the exterior 17 through the front surface side opening portion 25 provided in the exterior 17 in the horizontal direction.

(Extracting Process)

In the extracting process, the hub unit bearing 1 is extracted from the moving element 21. This extraction operation can be performed by the hand of the operator or automatically by the arm of the robot.

As described above, according to the rotary forging apparatus 16 and the rotary forging method of this embodiment, the conveying operation of the hub unit bearing 1 with respect to the machining space located below the forming die 18 can be performed without using the robot arm. For this reason, as in the case of performing such a conveying operation using the robot arm, since there is no need for a design for preventing the robot arm from hitting against the exterior 17, the equipment cost of the production line can be reduced. In particular, the rotary forging apparatus 16 of this example has an advantageous structure for performing the above-mentioned conveying operation, even when the opening portion of the exterior 17 is so small that the conveying operation of the hub unit bearing 1 with respect to the machining space cannot be performed using the arm of the robot (for example, when the opening portion of the exterior 17 is made smaller to secure sufficient rigidity of the exterior 17 or prevent the lubricant used in the machining space from scattering to the exterior space of the exterior 17).

The rotary forging method and the rotary forging apparatus of the present invention can be applied to a case of using various types of objects such as bearings other than the hub unit bearing as a workpiece, without being limited to a case of using the hub unit bearing as a workpiece. Further, the bearing equipped with the component subjected to the rotary forging machining is not limited to one incorporated in a vehicle, and can be one incorporated in various mechanical devices.

Further, the rotary forging apparatus of the present invention can adopt a configuration in which the forming die moves in the vertical direction, instead of a configuration in which the support table moves in the vertical direction.

In an embodiment, the conveying system (100) conveys the workpiece via the opening (25) of the wall (17) disposed between the set area and the machining area. The conveying system (100) includes a base (19, 28), a guide member (29) provided on the base (19, 28), a first moving element (30), a second moving element (31), a support mechanism (110), a spring (32), an a fixing mechanism (22). The movement of the first moving element (30) between the set area and the machining area is guided by the guide member (29). The second moving element (31) has a workpiece mounted thereon, and is disposed on the first moving element (30). The support mechanism (110) supports the second moving element (31) with respect to the first moving element (30). The spring (32) is disposed between the first moving element (30) and the second moving element (31) and supports the weight of at least a part of the second moving element (31). The fixing mechanism (22) fixes the second moving element (31) to the support mechanism (110) and the base (19, 28) in the machining area. The fixing mechanism (22) has a first mode in which the spring (32) is elastically deformed by applying a predetermined force in addition to the weight of the second moving element (31) and the base (19, 28) and the second moving element (31) are mechanically engaged with each other, and a second mode in which the predetermined force on the spring (32) is released and the mechanical engagement between the base (19, 28) and the second moving element (31) is released.

In the above embodiment, the support mechanism (110) is configured to allow movement of the second moving element (31) with respect to the first moving element (30) in the direction in which the elastic force of the spring (32) acts, and mechanically restrict the movement of the second moving element (31) with respect to the first moving element (30) in other directions.

In an example, the guide member (29) includes two guide rails (29), and the machining area includes a machining axis disposed between the two guide rails (29), and the fixing mechanism (22) includes at least three engagement pairs ((40, 44), and (39, 43)) used for the mechanical engagement between the base (19, 28) and the second moving element (31). The at least three engagement pairs ((40, 44), and (39, 43)) can have a first pair (39, 43) disposed at a position corresponding to the machining axis, and at least two second pairs (40, 44) disposed between the two guide rails (29) and disposed to surround the first pair (39, 43).

For example, each of the at least two second pairs (40, 44) can have a combination of a tapered depressed portion and a tapered protrusion portion.

The conveying system (100) of the above embodiment can be preferably used for rotary forging.

In an embodiment, a rotary forging method includes a loading process and a machining process. In the loading process, the moving element (21) holding the workpiece is loaded from the external space of the exterior (17) to the internal space (23) of the exterior (17) in the horizontal direction through the opening portion (25) provided in the exterior (17) constituting the rotary forging apparatus (16), while being guided by the guide member (20). In the machining process, after the loading process is completed, rotary forging is performed on the workpiece, using the forming die (18) provided in the internal space (23).

After the completion of the loading process, the fixing process can be performed before the start of the machining process. In the fixing process, the portion holding the workpiece is fixed to the support table (19) provided in the internal space (23), by elastically deforming a part of the moving element (21), on the basis of the downward displacement of the portion of the moving element (21) holding the workpiece.

In the fixing process, by engaging the moving element side engaging portion (40) provided in the portion of the moving element (1) holding the workpiece with the support table side engaging portion (44) provided directly or indirectly with respect to the support table (19), on the basis of the downward displacement of the portion of the moving element (21) holding the workpiece, the portion of the moving element (21) holding the workpiece can be fixed to the support table (19).

As a combination of the moving element side engaging portion (40) and the support table side engaging portion (44), it is possible to adopt a combination of the tapered depressed portion (40) and the tapered protrusion portion (44) which can be taper-fitted to each other.

In an embodiment, the rotary forging apparatus (16) includes an exterior (17), a forming die (18), a support table (19), a guide member (20) and a moving element (21). The exterior (17) has an opening portion (25) through which the internal space (23) and the external space communicate with each other in the horizontal direction. The forming die (18) is for performing a rotary forging process on the workpiece, and is disposed in the internal space (23). The support table (19) is disposed below the forming die (18) in the internal space (23). The guide member (20) is supported on the support table (19), and is provided to extend in the horizontal direction from the internal space (23) to the external space through the opening portion (25). The moving element (21) is capable of holding the workpiece, is movable in the horizontal direction, while being guided by the guide member (20) between the internal space (23) and the external space through the opening portion (25), and is capable of positioning the held workpiece below the forming die (18).

The moving element (21) can have a moving element base portion (30) guided by the guide member (20), a moving element holding portion (31) capable of holding the workpiece, and a spring (32) which supports the moving element holding portion (31) with respect to the moving element base portion (30) and is configured to allow downward displacement of the moving element holding portion (31) with respect to the moving element base portion (30) by its own elastic deformation. The moving element (21) can include a fixing mechanism (22) which fixes the moving element holding portion (31) to the support table (19), on the basis of the downward displacement of the moving element holding portion (31), by elastically deforming the spring (32) at a position at which the workpiece held by the moving element holding portion (31) is located below the forming die (18).

The fixing mechanism (22) can have a displacement force applying member (42) which applies a force of elastically deforming the spring (32) to displace the moving element holding portion (31) downward with respect to the moving element holding portion (31), and a moving element side engaging portion (40) provided on the moving element holding portion (31), and a support table, side engaging portion (44) provided directly or indirectly on the support table (19) which engage with each other, when the moving element holding portion (31) is displaced downward by the force.

As a combination of the moving element side engaging portion (40) and the support table side engaging portion (44), it is possible to adopt a combination of the tapered depressed portion (40) and the tapered protrusion portion (44) which can be taper-fitted to each other.

In an embodiment, the method of manufacturing a bearing is directed to a bearing (1) equipped with a component having the caulking portion (15), and the caulking portion (15) of the component is machined by the rotary forging method of the present invention.

In an embodiment, a method of manufacturing a vehicle is directed to a vehicle provided with the hub unit bearing (1) which is a bearing for supporting wheels, and the hub unit bearing (1) is manufactured by the method of manufacturing a bearing according to the present invention.

In an embodiment, a method of manufacturing mechanical device is directed to a mechanical device provided with a bearing, and the bearing (1) is manufactured by the method of manufacturing a bearing according to the present Invention.

REFERENCE SIGNS LIST

1 Hub unit bearing
2 Outer ring
3 Hub
4 Rolling element
5 Outer ring raceway
6 Stationary flame
7 Support hole
8 Inner ring raceway
9 Rotating flange
10 Mounting hole
11 Hub ring
12a, 12b Inner ring
13 Fitting surface portion
14 Cylindrical portion
15 Caulking portion
16 Rotary forging apparatus
17 Exterior
18 Forming die
19 Support table
20 Guide member
21 Moving element
22 Fixing mechanism 23 Internal space
24 Column frame
25 Front surface side opening portion
26 Side surface side opening portion
27 Machining, surface portion
28 Base plate portion
29 Guide rail
30 Moving element base portion
31 Moving element holding portion
32 Spring
33 Guide block
34 Support plate
35 Guide pin
36 Moving table
37 Receiving die
38 Guide hole
39 Central depressed portion
40 Tapered depressed portion
41 Backup plate
42 Pressing member
43 Central protrusion portion
44 Tapered protrusion portion
45 Discontinuous portion
46 Stepped surface
47 Moving element driving apparatus
48 Pressing member driving apparatus
49 Outer ring driving apparatus
50 Stopper
100 Conveying system
110 Support mechanism

The invention claimed is:

1. A conveying system which conveys a workpiece via an opening of a wall disposed between a set area and a machining area, the conveying system comprising:
   a base;
   a guide member provided on the base;
   a first moving element in which a movement between the set area and the machining area is guided by the guide member;
   a second moving element which has a workpiece mounted thereon, and is disposed on the first moving element;
   a support mechanism which supports the second moving element with respect to the first moving element, and has a spring disposed between the first moving element and the second moving element and which supports a weight of at least a part of the second moving element; and
   a fixing mechanism which fixes the second moving element to the base in the machining area, and has a first mode in which the spring is elastically deformed by applying a predetermined force in addition to the weight of the second moving element and the base and the second moving element are mechanically engaged with each other, and a second mode in which the predetermined force on the spring is released and a mechanical engagement between the base and the second moving element is released.

2. The conveying system according to claim 1, wherein the support mechanism allows the movement of the second moving element with respect to the first moving element in a direction in which an elastic force of the spring acts, and mechanically restricts the movement of the second moving element with respect to the first moving element in other directions.

3. The conveying system according to claim 1, wherein the guide member includes two guide rails,
   the machining area includes a machining axis disposed between the two guide rails,
   the fixing mechanism includes at least three engagement pairs used for the mechanical engagement between the base and the second moving element, and
   the at least three engagement pairs have a first pair disposed at a position corresponding to the machining axis, and at least two second pairs disposed between the two guide rails and disposed to surround the first pair.

4. The conveying system according to claim 3, wherein each of the at least two second pairs has a combination of a tapered depressed portion and a tapered protrusion portion.

5. The conveying system according to claim 1, wherein the conveying system is used for rotary forging.

6. A rotary forging method comprising:
   loading a workpiece, using the conveying system according to claim 1, from the exterior, to an internal space of a rotary forging apparatus in a horizontal direction through an opening portion provided in said rotary forging apparatus; and
   performing the rotary forging on the workpiece, using a forming die provided in the internal space, after completion of the loading.

7. A method of manufacturing a bearing equipped with a component having a caulking portion, wherein the caulking portion of the component is processed by the rotary forging method according to claim 6.

8. A method of manufacturing a vehicle equipped with a hub unit bearing which is a bearing for supporting wheels, wherein the hub unit bearing is manufactured by the method of manufacturing a bearing according to claim 7.

9. A method of manufacturing a mechanical device equipped with a bearing, wherein the bearing is manufactured by the method of manufacturing a bearing according to claim 7.

* * * * *